United States Patent [19]

Keck et al.

[11] Patent Number: 5,048,177
[45] Date of Patent: Sep. 17, 1991

[54] GENERATOR ROTOR SLOT WEDGE TOOL

[75] Inventors: Richard J. Keck; Dennis R. Ulery, both of Saratoga, N.Y.

[73] Assignee: General Electric Company, Schenectady, N.Y.

[21] Appl. No.: 610,579

[22] Filed: Nov. 8, 1990

Related U.S. Application Data

[62] Division of Ser. No. 557,725, Jul. 26, 1990.

[51] Int. Cl.⁵ ............................................. H02K 15/10
[52] U.S. Cl. .................................... 29/734; 29/283
[58] Field of Search ............. 29/734, 732, 736, 426.5, 29/596, 283

[56] References Cited

U.S. PATENT DOCUMENTS

| | | |
|---|---|---|
| 1,238,911 | 9/1917 | Hensley . |
| 1,487,302 | 3/1924 | Willis . |
| 2,424,752 | 7/1947 | Heermans ............................ 29/205 |
| 2,507,981 | 5/1950 | Krause ............................... 171/324 |
| 2,685,730 | 8/1954 | Probst ................................ 29/205 |
| 3,888,638 | 6/1975 | Walker ............................... 29/205 |
| 4,024,632 | 5/1977 | Inglis ................................. 29/736 |
| 4,104,788 | 8/1978 | Kindig ............................... 29/596 |
| 4,476,625 | 10/1984 | Bricker et al. ..................... 29/734 |
| 4,495,692 | 1/1985 | Walker ............................... 29/564 |
| 4,536,954 | 8/1985 | Hattori .............................. 29/736 |
| 4,594,771 | 6/1986 | Appenzeller et al. ............. 29/596 |

Primary Examiner—Carl E. Hall
Attorney, Agent, or Firm—Nixon & Vanderhye

[57] ABSTRACT

A method and apparatus for the assembly and disassembly of dovetail shaped wedges into and from the coil slots of dynamoelectric rotors using a fixture attached to a rotor shaft coupling in a selectable radial position so as to be aligned with a rotor slot. The method and apparatus further uses a pulling tool attached to a wedge and also connected to a winch located on the fixture via a winch belt extending between the tool and fixture.

9 Claims, 4 Drawing Sheets

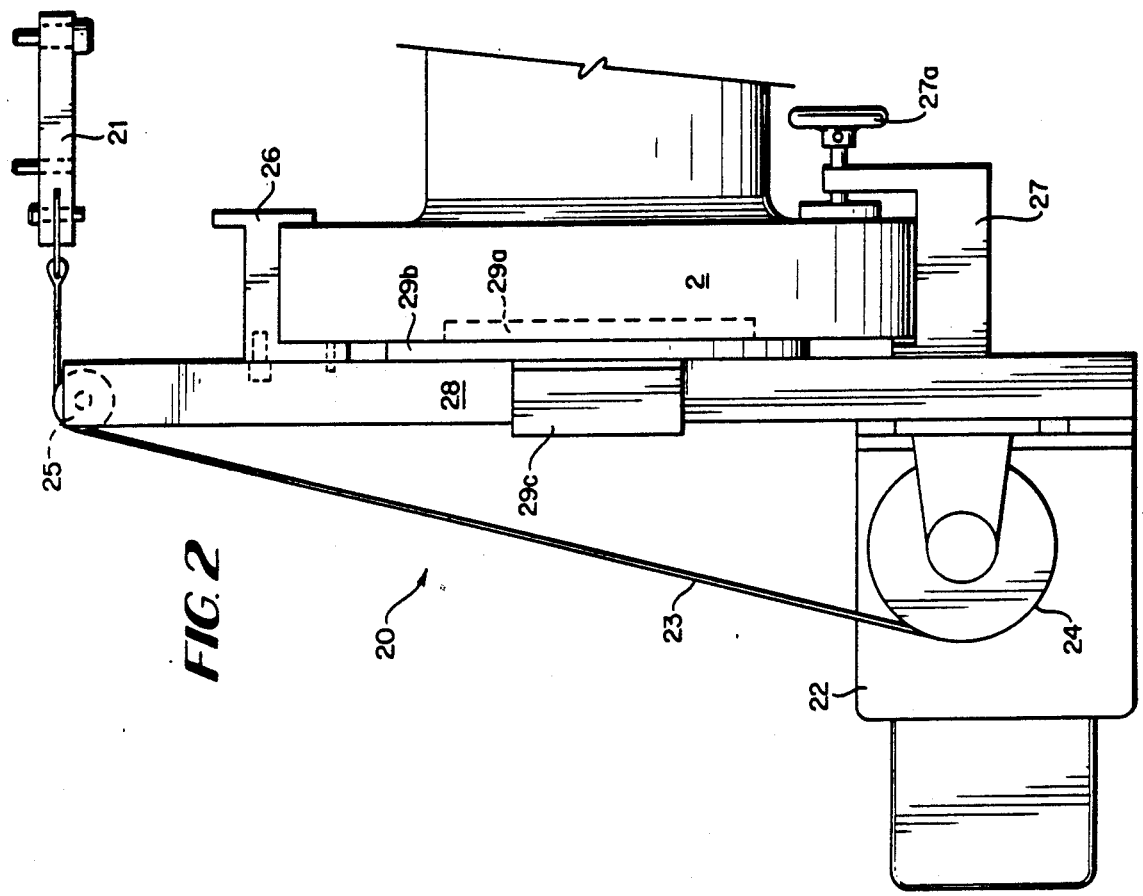
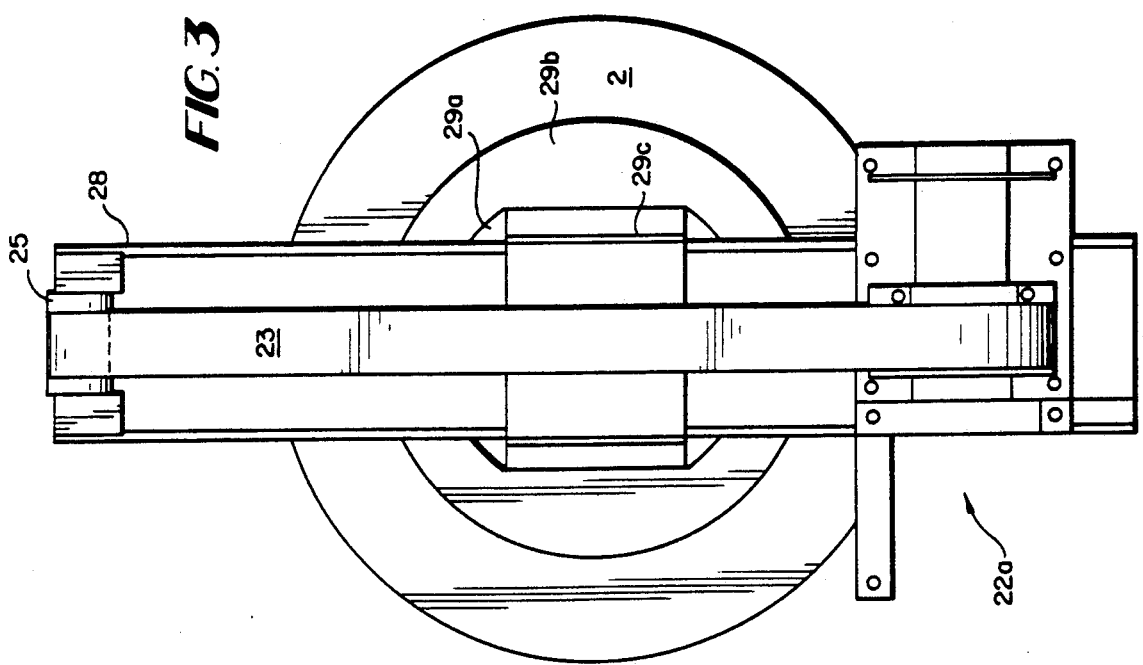

GENERATOR ROTOR SLOT WEDGE TOOL

This is a division of application Ser. No. 07/557,725, filed July 26, 1990.

FIELD OF THE INVENTION

The invention relates to methods and tools used for inserting and removing dovetail slot wedges which maintain generator rotor copper coils in place.

BACKGROUND AND SUMMARY OF THE INVENTION

The rotors of dynamoelectric machines contain field windings that produce the magnetic flux which in turn produces the stator current and voltage. Proper cooling of such rotor windings, especially in large generators, is important in order to provide and maintain optimal performance. Direct conductor cooling methods are employed for heat removal purposes in machines of larger ratings. Such direct cooling methods include impressing cooling fluid at the ends of the rotor body whereby the fluid passes into full length subslots for radial discharge along the length of the rotor body by way of radial slots that have been machined or punched through the copper conductors, creepage blocks and wedges included in the rotor slots.

As ratings of such machines increase, the length of the rotor increases requiring corresponding increases in the lengths of the copper coils, creepage blocks, as well as the slot wedges. The slot wedges, which are generally dovetail shaped, are used to maintain the copper coils in place while the rotor is spinning at, for example, 3600 revolutions per minute. In the prior art such coil slot wedges were normally 6 to 12 inches long with a number of such wedges being required for each coil slot, particularly in the longer rotors with high electrical ratings. In an effort to decrease the number of parts that are required for assembly as well as increasing the overall speed of such assembly, full length wedges have been designed and used. In two conventional such arrangements the exemplary wedges are 72 inches and 130 inches long, respectively. Such wedges have conventionally been driven into the slots with a hammer and tamping block. Although the full length wedges have been assembled with relatively little difficulty in the 72 inch long example, the assembly process is nevertheless slow. As to the longer exemplary length, assembly is even slower and somewhat more difficult.

We have discovered that through the use of a specially designed tool attached, for example, to the ventilation holes of such wedges along with a winch using a high strength cable or strap and a tool fixture attached to the rotor shaft, such full length wedges may be pulled into or out of the coil slots relatively quickly and with far less difficulty than in the prior art. Moreover, our assembly/disassembly tool and fixture may be rotated on the rotor shaft coupling, for example, so as to be aligned with any of the coil slots.

We have also discovered that the tool may be attached to the radially inward or outward surfaces of the slot wedges, thus allowing disassembly of wedges whose lengths exceed the distance from the rotor coupling to the slots. That is to say, in the disassembly of very long wedges, the tool and wedge upon being drawn approximately even with the tool fixture at the rotor coupling may be disconnected from the outer surface of the wedge, inverted and connected to the inner surface of the wedge near the rotor slot so that the wedge may be withdrawn further. The process steps are repeated the number of times necessary in order to completely withdraw the wedge from the coil slot.

These and other objects and advantages of the present invention will become apparent upon reference to the following specification, appended claims and drawings.

BRIEF DESCRIPTION OF THE DRAWINGS

FIG. 2 is a side view of the slot wedge assembly/disassembly tool and fixture attached to the generator shaft coupling at the turbine end;

FIG. 3 is an end view of the generator shaft coupling with the wedge assembly/disassembly fixture attached to the coupling but with the winch removed;

DETAILED DESCRIPTION OF THE DRAWINGS

Figure 1A:
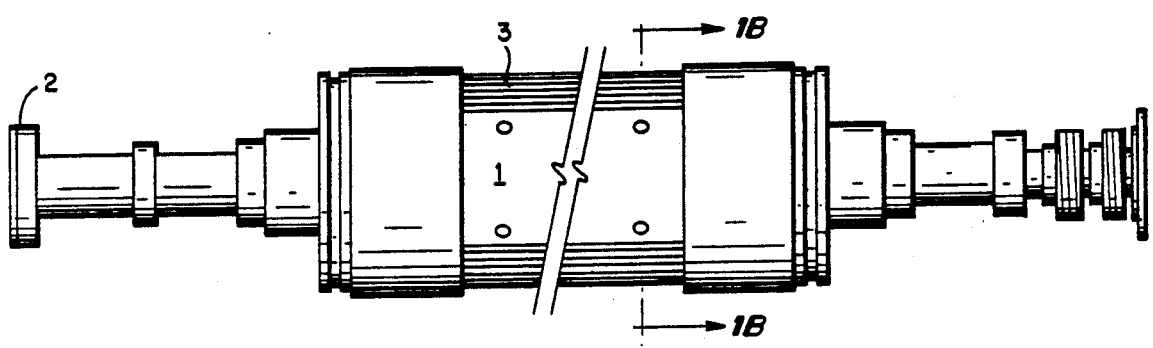
FIG. 1A shows a generator rotor including coil slots with which the disclosed assembly/disassembly tool and fixture are to be used.

FIGS. 1A through 1D show the general environment and field of use for the slot wedge assembly/disassembly tool and fixture. FIG. 1A, for example, illustrates a typical rotor 1 for a dynamoelectric machine wherein the rotor includes conventional elements such as a coupling 2 for connection with a turbine or gear reduction unit, as well as coil slots 3 for holding copper conductors and coil slot wedges, for example. As previously noted, as the ratings of such machines increase, the length of the rotor increases and may include exemplary rotor slot lengths of 72 and 130 inches.

Figure 1B:
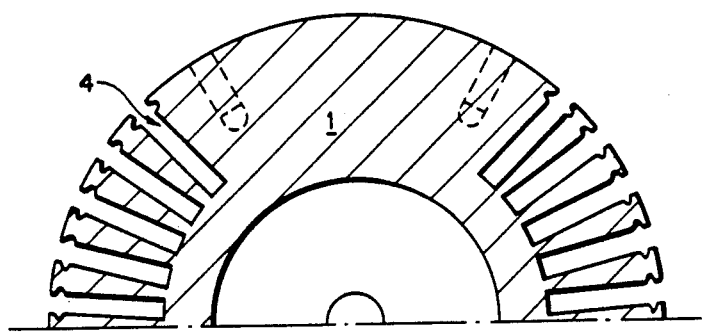
FIG. 1B shows the generator rotor body in partial cross section along line 1B with the slots empty.
Figure 1D:
FIG. 1D shows a side view of an exemplary wedge including the placement of evenly spaced ventilation holes.
Figure 1C:
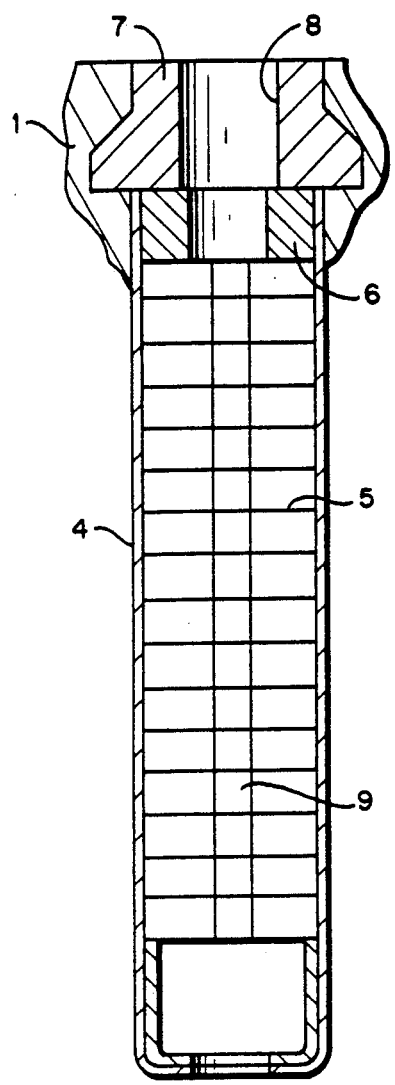
FIG. 1C shows a typical coil slot and contents including a dovetail shaped wedge used to keep the coils in place while the rotor is spinning.

As illustrated in FIGS. 1B and 1C, the rotor slots 4 are radially directed and include insulated copper coils 5, a creepage block 6 and a slot wedge 7. The wedge is generally dovetail shaped in cross section and located so as to maintain the copper coils and creepage block in place while the rotor is spinning. As may be seen from a consideration of FIGS. 1C and 1D, the slot wedges 7 include ventilation holes 8 which are equally spaced in the general manner indicated in FIG. 1D so as to be in alignment with ventilation channels 9 which pass through the conductors, insulation and creepage blocks.

Where full length wedges are used and assembled by being driven into the rotor slots in the conventional manner previously noted, i.e. by using a hammer and tamping block, such assembly is clearly tedious, time consuming and difficult, particularly where such wedges are formed of stainless steel and exceed five feet in length. FIG. 2 is illustrative of our rotor wedge pulling fixture 20 including an assembly/disassembly tool 21, and a pneumatic or electric winch device 22. The winch device includes a high strength cable such as a polyester strap or belt 23 which passes from the winch belt storage drum 24 over roller 25 and ultimately is connected to the assembly/disassembly tool 21.

As illustrated in both FIGS. 2 and 3, the rotor wedge pulling fixture 20 includes a winch mounting frame 22a and is shown attached to coupling 2 of the turbine end of a generator shaft through the use of clamp assemblies 26 and 27. These clamp assemblies are adjustably affixed to the tool fixture beam 28 so that the tool fixture may be attached to couplings of various diameters. Clamp assembly 26, for example, may be affixed to beam 28 by way of a bolt and dowel pin arrangement using different sets of bore holes along the beam; only one set of which is illustrated. Clamp assembly 27 is affixed to beam 28 by way of an unillustrated beam slot and bolting arrangement such that the assembly is slidably adjustable in the vertical direction as illustrated in FIG. 2, for example. The assembly is fixed in place by turning the threaded rod and attached knob 27a.

Pilot plates 29a and 29b are fastened together by unillustrated flathead screws and are fastened to beam 28 along with pilot assembly side guide 29c through the use of a further unillustrated bolting arrangement. Pilot plates 29a and 29b are sized and configured to fit at least two different turbine coupling rabbet geometries included in the end face of coupling 2. As illustrated in FIG. 2, pilot plate 29a is generally sized and configured to be complementary to the rabbet geometry of the illustrated coupling. The plate functions to maintain the rotor wedge pulling fixture 20 centered on the coupling while still allowing the fixture to be rotated about the coupling so that the tool 21 may be aligned with any of the rotor coil slots about the periphery of the rotor when the clamping arrangements 26 and 27 are loosened.

In order to attach the fixture 20, as illustrated in FIG. 2, to a coupling having a rabbet geometry complementary to the size and shape of pilot plate 29b, both of the pilot plates would be unbolted from the beam 28, inverted or reversed in order and reattached to the fixture beam prior to mounting the fixture 20 to the coupling. In this manner the rotor wedge pulling fixture is made more versatile in that it may be used for the assembly and disassembly of rotor wedges for a number of different rotor and coupling arrangements.

Figure 4:
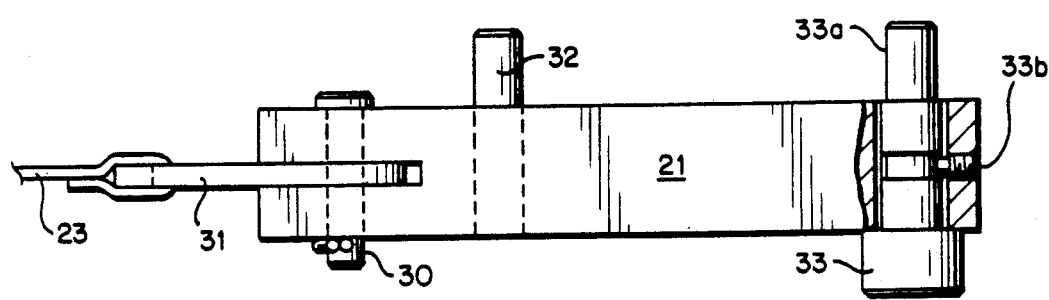
FIG. 4 is a side view of the wedge pulling tool.
Figure 5:
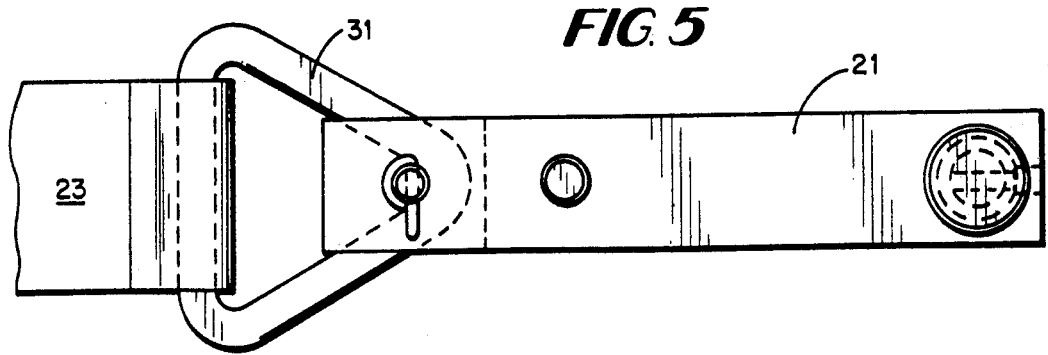
FIG. 5 is a plan view of the wedge pulling tool attached to the winch belt assembly.
Figure 6A:
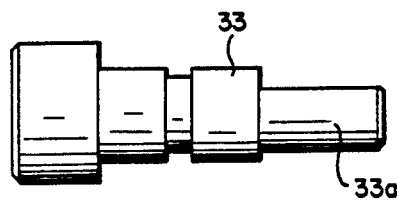
FIGS. 6A and 6B are two views of the eccentric locking stud included in the wedge pulling tool.
Figure 6B:
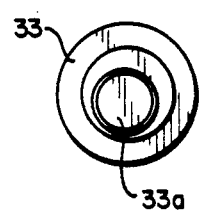

FIGS. 4 and 5 illustrate in side and plan views, respectively, the assembly/disassembly tool 21 attached to the winch belt 23 by way of clevis pin 30 and belt connecting element 31. The assembly/disassembly tool 21 includes a metal dowel 32 as well as an eccentric locking stud 33. Elements 32 and 33 are of a size and are spaced so as to conform to the size and spacing of the wedge ventilation holes 8, as illustrated in FIGS. 1C and 1D, for example. As a safety feature, locking stud 33 is constructed in the eccentric manner illustrated in FIGS. 6A and 6B so that when inserted in a wedge ventilating hole, the stud may be turned for frictional engagement of portion 33a with the side of the wedge ventilation hole. The stud is then locked in place with a set screw 33b so that tool 21 is frictionally retained on the wedge.

Figure 7A:
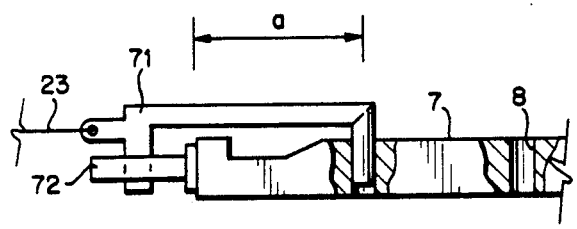
FIGS. 7A through 7C are general illustrations of alternative tool designs that may be used with the wedge assembly/disassembly fixture.
Figure 7B:
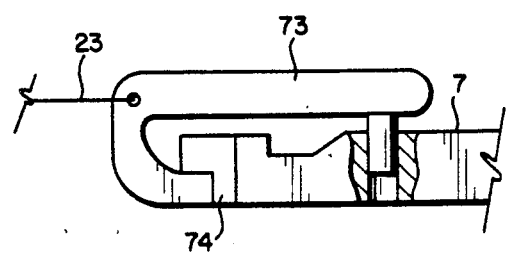
Figure 7C:
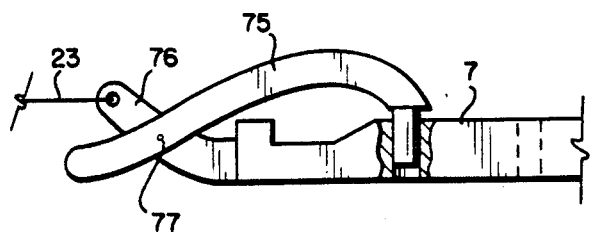

Although the assembly/disassembly tool 21 illustrated in FIGS. 4 and 5 is the preferred embodiment, the distance between elements 32 and 33 is not adjustable. If need be, however, the tool may be made with any selected distance between the pin elements. Alternatively, an adjustable assembly/disassembly tool of the nature generally illustrated in FIGS. 7A, 7B or 7C made be made whereby the distance "a" between a dowel and another portion of the tool is adjustable. In FIG. 7A, for example, elements 71 and 72 may be connected in a spring loaded fashion such that they are movably adjustable with respect to each other, and, therefore, distance "a" would be adjustable in use from one wedge to another. In FIG. 7B, plate element 74 may be removably attached to element 73 and may be made in a variety of sizes so as to adjust the distance between the wedge engaging elements in a manner similar to that illustrated in FIG. 7A. The assembly/disassembly tool of FIG. 7C may also be adjustable since elements 75 and 76 are hinged with a pin at 77 and would be movably adjustable with respect to one another by tensioning the winch belt or strap 23.

In operation the fixture 20 would be attached to a rotor shaft coupling 2 by appropriately positioning plates 29a and 29b as well as properly adjusting clamping assemblies 26 and 27 for the appropriate coupling diameter. The fixture 20 would additionally be positioned in the appropriate radial direction so that the tool 21, pulley 25, the wedge and the corresponding coil slot would be aligned such that the pulling force on the wedge would be substantially linear with the long dimension of the wedge. When assembling a wedge into the rotor slot, the tool and winch strap would be extended to the end of the rotor slot away from the coupling 2 and the tool would be attached to the outer surface of the wedge by way of ventilation holes. The locking stud 33 would then be adjusted and locked in the previously described manner so that the assembly tool remained frictionally engaged to the wedge. Thereafter, the winch would be energized to pull the wedge completely into the slot.

After each wedge is completely inserted into a slot the tool is disconnected, clamping assembly 26 and 27 loosened, and fixture 20 rotated to a new radial orientation so as to be aligned with the next slot to be operated on. In this manner, wedges may be inserted into the rotor slots in a relatively fast and trouble free manner.

Disassembly of such wedges from the rotor slots is accomplished in a somewhat similar fashion. That is to say, after attaching fixture 20 to the coupling 2 and aligning the tool 21 and pulley 25 with the appropriate slot, the tool is extended to the nearest end of the rotor slot and attached to the outer surface wedge ventilation holes in the manner previously described. Thereafter the winch is operated to withdraw the wedge and tool 21 to the approximate position illustrated in FIG. 2. If full length wedges are used, the length of the rotor slot and wedge would typically be longer than the distance between coupling 2 and the near end of the rotor slot. In order to completely withdraw or disassemble such wedges from the rotor, we have discovered that the tool 21 must be disconnected from the outer surface of the wedge, inverted and placed in ventilation holes on the inner surface of the wedge adjacent to the end of the rotor slot. When the winch is again operated to further withdraw the wedge, the free end of the wedge may be easily manipulated to clear not only the coupling but also the fixture 20, whereas, failure to invert the tool would render such manipulation difficult if not impossible. The above operation is repeated until the wedge is completely removed from the slot. Thereafter, the fixture may be located in a new radial position so as to be aligned with another wedge and slot. In this manner the disclosed fixture and tool may be efficiently used for both assembly and disassembly of control slot wedges.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A tool for use in an apparatus for inserting or removing coil slot wedges into or from the coil slots of a cylindrical body, said tool comprising:

an elongated body;

a connecting means at one end of said elongated body for connecting it to a high strength flexible pulling medium;

said elongated body including at least one protruding dowel means, said dowel means being of a size and shape for engaging an opening in said coil slot wedges;

said body including additional means for attaching said elongated body to a coil slot wedge.

2. A tool as in claim 1 wherein the distance between said additional means and said at least one dowel means is adjustable.

3. A tool as in claim 1 wherein said additional means comprises a dowel shaped element.

4. A tool as in claim 3 wherein said dowel shaped element includes means for frictionally retaining said body on a coil slot wedge.

5. A tool as in claim 1 wherein said at least one dowel means and said additional means are spaced for attachment to equally spaced openings in said coil slot wedges.

6. A tool as in claim 1 wherein said dowel means includes an eccentric locking stud.

7. A tool as in claim 6 wherein said stud when inserted into said opening and turned forms a frictional engagement between said tool and said wedge.

8. A tool as in claim 1 wherein said cylindrical body is a rotor for a dynamoelectric machine.

9. A tool as in claim 1 wherein said connecting means includes a clevis pin and a flexible belt connecting element.

* * * * *